United States Patent [19]

Guest et al.

[11] Patent Number: 5,244,946

[45] Date of Patent: Sep. 14, 1993

[54] STYRENIC COPOLYMER/POLYACETAL/THERMOPLASTIC POLYURETHANE OR ELASTOMERIC COPOLYESTER BLEND COMPOSITIONS

[75] Inventors: Martin J. Guest, Terneuzen; P. F. M. v/d Berghen, Graauw, both of Netherlands; Ludo M. Aerts, Lokeren, Belgium; Antonios Gkogkidis, Terneuzen, Netherlands; Abraham F. de Bert, Zelzate, Belgium

[73] Assignee: The Dow Chemical Company, Midland, Mich.

[21] Appl. No.: 865,721

[22] Filed: Apr. 8, 1992

Related U.S. Application Data

[63] Continuation of Ser. No. 474,416, Feb. 2, 1990, abandoned.

[51] Int. Cl.⁵ .................. C08L 25/08; C08L 51/06; C08L 55/02
[52] U.S. Cl. .................. 524/86; 524/291; 524/504; 524/507; 524/512; 525/64; 525/66; 525/131; 525/154; 525/399; 525/400

[58] Field of Search ............... 524/504, 507, 512, 86, 524/291; 525/64, 66, 399, 131, 154, 400

[56] References Cited

U.S. PATENT DOCUMENTS

| 3,636,140 | 1/1972 | Ingulli | 525/68 |
| 4,200,567 | 4/1980 | Goldman | 525/63 |
| 4,277,577 | 7/1981 | Burg | 525/154 |
| 4,665,126 | 5/1987 | Kusumgar | 525/66 |
| 4,713,414 | 12/1987 | Kusumgar | 525/66 |

FOREIGN PATENT DOCUMENTS

0424755 5/1991 European Pat. Off. .
61-171756 8/1986 Japan .

Primary Examiner—Patricia A. Short

[57] ABSTRACT

Thermoplastic polymer blends comprising a monovinylidene aromatic copolymer, an acetal polymer and an elastomeric material such as a thermoplastic polyurethane or an elastomeric copolyester have good processability and a beneficial combination of physical and chemical properties including thermal/dimensional stability, impact resistance, chemical resistance and creep resistance. Said polymer blends are suitable for use in the preparation of a variety of molded utilitarian articles having good appearance and paintability.

13 Claims, No Drawings

STYRENIC COPOLYMER/POLYACETAL/THERMOPLASTIC POLYURETHANE OR ELASTOMERIC COPOLYESTER BLEND COMPOSITIONS

CROSS-REFERENCE TO RELATED APPLICATION

This is a continuation of application Ser. No. 474,416, filed Feb. 2, 1990, now abandoned.

BACKGROUND OF THE INVENTION

The present invention pertains generally to thermoplastic polymer blends comprising a monovinylidene aromatic copolymer in combination with an acetal polymer and an elastomeric polymer selected from the group consisting of thermoplastic polyurethanes, copolyester elastomers and combinations thereof. In one particularly preferred embodiment hereof, the monovinylidene aromatic copolymer is a rubber-modified monovinylidene aromatic copolymer having from about 1 to about 40 weight percent of dispersed rubber particles contained therein.

Blends of various and varying types of polymeric materials have been suggested over the years in a variety of prior art references. Of these, the prior art references utilizing acetal resins as blend components generally illustrate compositions in which the acetal resin forms the major or continuous phase, presumably because of large shrinkage and associated interfacial stress build-up occurring upon cooling from the melt. For example, U.S. Pat. No. 4,665,126 to Kusumgar et al. discloses certain polymeric molding compositions containing a predominant amount (e.g., from about 60 to 95 weight percent) of an acetal polymer ingredient in combination with relatively lesser amounts (e.g., from about 4 to 30 and from about 1 to 10 weight percent, respectively) of a thermoplastic polyurethane (TPU) and a multiphase composite interpolymer such as, for example, a butadiene-based, rubber-modified styrene/methyl- methacrylate polymer. Such Kusumgar et al. formulations are said to have improved impact strength relative to that of the acetal polymer per se and relative to that of comparable two component acetal/TPU or acetal/multiphase composite interpolymer blends and to be useful in various molding applications.

U.S. Pat. No.. 4,694,042 to McKee et al. pertains to thermoplastic molding polymer blends containing a minor proportion (i.e., from 5 to 50 parts) by volume of a partially or completely crystalline polymer such as nylon, polyacetal, etc. wherein said crystalline polymer, even though employed in minor volumetric proportion, is nevertheless considered to form a coherent phase and wherein the second, major proportion component forms a dispersed phase therein. Within the indicated McKee et al. blends, said major proportion (i.e., from 50 to 95 parts by volume) component consists of one or more crosslinked, emulsion-polymerized elastomeric polymers such as, for example, butadiene or acrylate rubber-based graft copolymers containing either from 10 to 50 weight percent of a shell having a glass transition temperature of less than −10° C. or a substantially lesser amount of a hard polymer shell of styrene, methylmethacrylate or styrene acrylonitrile copolymer. Acetal resin-based compositions are not evident in the working examples.

British Patent 1,311,305 discloses thermoplastic molding compositions composed of a mixture of from 50 to 99 weight percent of an acetal polymer and from 1 to about 50 weight percent of a butadiene or acrylate rubber-modified, two-phase polymer mixture. Such thermoplastic molding compositions are described as having considerably improved impact strength relative to that of the acetal polymer per se. Preferred embodiments of this reference utilize 80 to 95 weight percent of the acetal polymer component.

U.S. Pat. No. 4,639,488 to Schuette et al. discloses impact resistant polyacetal-based molding materials containing from 30 to 95 weight percent of an acetal polymer and from 5 to 70 weight percent of an emulsion polymerized elastomeric graft copolymer composed, on a graft copolymer weight basis, of from 60 to 90 weight percent of a butadiene-based core (or "grafting base") and from 10 to 40 weight percent of a grafted shell of a styrene and/or methylmethacrylate-based polymer or copolymer. Such molding materials are said to have high impact strength at low temperatures, to exhibit good thermal stability and to resist discoloration in the presence of light.

U.S. Pat. No. 4,179,479 to Carter discloses thermoplastic polymer blend compositions containing from 40 to 100 weight percent of a thermoplastic polyurethane in combination with up to 60 weight percent of a thermoplastic polymer which can be, among a variety of other things, an ABS resin, an acetal resin or a mixture thereof. Such compositions are also required to contain 0.5 to 10 weight percent of an acrylic polymer processing aid in order to improve the processability and molding characteristics of the polymer compositions in question.

U.S. Pat. No. 4,117,033 to Gale discloses polymer blends containing an acetal resin in combination with from 0.1 to 5 weight percent of a low molecular weight copolyether-ester resin. Said copolyether-ester resin is said to improve the melt processability of the indicated acetal resin.

U.S. Pat. No. 4,683,267 to Lindner et al. discloses molding compounds consisting of a mixture of from 60 to 99.00 parts by weight of an acetal resin, from 0 to 40 parts by weight of an elastomer softening below the melting point of said acetal resin and from 0.01 to 40 parts by weight of an aliphatic, rubber-like, high molecular weight adipate-carbonate mixed ester. Elastomers said to be useful in the Lindner et al. blends include homopolymers and copolymers of alpha-defins, homopolymers and copolymers of 1,3-dienes, copolymers and homopolymers of vinyl esters and copolymers and homopolymers of acrylate and methacrylate esters.

Another publication concerned with blends of polyacetal resins and polystyrene resins is Japanese Kokai No 64-38463, published Feb. 8, 1989. Such publication is essentially concerned with polyacetal/polystyrene blends wherein the polyacetal constitutes the major portion by weight thereof and requires in all events that the ratio of the polyacetal melt flow rate (MFR, ASTM D-11238 at 190° C. and 2160g) to the polystyrene melt flow rate (ASTM D-16238 at 200° C. and 5000g) be from 5:1 to 100:1. According to such publication, excellent surface appearance is obtained by operating within, and only by operating within, the indicated range of polyacetal: polystyrene melt flow rate ratios. Also according to such publication, the polymer blends thereof may optionally contain additional polymer ingredients such as a polyurethane resin, olefinic homopolymer or copolymer resins, acrylate resins, polyamide or polyester resins or ABS resins There remains a continuing need to provide engineering thermoplastic materials having a beneficial balance of processability, good aesthetics with no pearlescence and having alternative, advantageous property profiles such as mechanical strength, impact resistance, creep and chemical resistance and practical toughness as provided by the present invention.

SUMMARY OF THE INVENTION

In accordance with the foregoing, certain polymer blend compositions have now been developed having an advantageous combination of properties of the sort set forth above. Thus, the present invention, in one of its aspects, is a polymer blend composition comprising, on the basis of a total of 100 parts by weight of the stated polymer ingredients:

A. from about 5 to about 98 parts by weight of a monovinylidene aromatic copolymer ingredient selected from the group consisting of
1. non-rubber-modified monovinylidene aromatic copolymers comprising, in polymerized form and on an aromatic copolymer ingredient weight basis, from about 55 to about 99 weight percent of one or more monovinylidene aromatic monomers and from about 1 to about 45 weight percent of one or more relatively polar comonomer ingredients: and
2. rubber-modified monovinylidene aromatic copolymers comprising, in polymerized form and on a rubber-modified copolymer weight basis from about 60 to about 99 weight percent of one or more monovinylidene aromatic copolymer as described in item A. 1. above and from about 1 to about 40 weight percent of dispersed particles of a rubbery polymer having a glass transition temperature of 0° C. or lower:

B. from about 1 to about 94 parts by weight of be either linear or branched and which can be employed either singly or in combination: and C. from about 1 to about 50 parts by weight of an elastomeric polymer selected from the group consisting of thermoplastic polyurethanes, copolyester elastomers and mixtures thereof.

In one of its especially preferred aspects or embodiments, the aforementioned polymer blend composition employs as its monovinylidene aromatic copolymer ingredient a rubber-modified monovinylidene aromatic copolymer comprising, on a rubber-modified copolymer weight basis, from about 3 to about 25 weight percent of dispersed particles of a rubbery polymer selected from the group consisting of homopolymers of a 1,3-conjugated alkadiene monomer and copolymers of from about 60 to about 99 weight percent of a 1,3-conjugated alkadiene monomer with from about 1 to about 40 weight percent of a monoethylenically unsaturated monomer.

In another especially preferred embodiment, the indicated acetal homopolymer or copolymer and monovinylidene aromatic copolymer ingredients are employed in combination with one or more ester-containing or ester-based elastomeric materials (such as, for example, ester-based thermoplastic polyurethanes and copolyester elastomers) used either alone or in combination with each other or in combination with up to about 70 weight on a total elastomer weight basis of a non-ester-based elastomeric material such as, for example, an ether-based thermoplastic polyurethane.

In another preferred embodiment, the polymer blend compositions hereof further comprise from about 0.01 to about 5 weight percent, on a total composition weight basis, of an antioxidant and/or an ultraviolet light (U.V.) stabilizer ingredient selected from the group consisting of (a) light stabilizers comprising sterically hindered amines and/or ester functional groups such as, for example, bis (2,2,6,6-tetramethyl-4-piperidyl) sebacate (commercially available as TINUVIN ® 770 from Ciba Geigy); (b) light stabilizers comprising substituted benzo-triazoles such as, for example TINUVIN ®P and TINUVIN ®234, (also commerically available from Ciba Geigy): and (c) antioxidant additives comprising p-hydroxyphenyl-propionic acid ester, such as, for example, tri-ethyleneglycol-bis-3(3-tert-butyl-4-hydroxy-5-methylphenyl) propionate which is available from Ciba Geigy as IRGANOX ®245. Surprisingly, the presence of the indicated stabilizer/antioxidant ingredients serves to substantially increase the impact strength of the subject polymer compositions.

In yet another especially preferred embodiment hereof, the subject polymer blend compositions further comprise, on a total composition weight basis, from about 5 to about 80 weight percent of a particulate or fibrous inorganic filler or reinforcing ingredient such as, for example, fibers of carbon, graphite, glass and mica. Other mineral fibers such as fibers of titanium oxide or potassium titanate can also be, but are less preferably, employed. The most preferred fiber for use herein is glass fiber. Such filled or reinforced polymer blends (particularly when said blends employ fiberglass as the reinforcing agent at levels of from about 15 to 30 or 40 weight percent thereof) have been observed to exhibit unexpectedly enhanced thermal (e.g., heat distortion) and impact performance.

The indicated polymer blends have a highly advantageous combination of physical and mechanical properties including chemical resistance, creep resistance, impact and tensile strength and thermo/dimensional stability, together with good processability. As such, they are suitable for use in the preparation of a wide variety of molded utilitarian and/or decorative articles such as, for example, appliance cabinets or housings, interior and exterior automobile parts, etc.

DETAILED DESCRIPTION OF THE INVENTION

As has been noted above, the polymer blend compositions hereof contain a monovinylidene aromatic copolymer ingredient which can either be rubber-modified or non-rubber-modified. In either case, suitable monovinylidene aromatic monomer constituents include styrene, alkyl substituted styrenes such as alpha-alkylstyrene (e.g., alpha-methylstyrene, alpha-ethylstyrene etc.), various ring-substituted styrenes such as paramethylstyrene, ortho-ethylstyrene, 2,4-dimethylstyrene, etc., rin9-substituted halo-styrenes such as chlorostyrene, 2,4-dichloro-styrene, etc. and the like. Such monovinylidene aromatic monomer (especially styrene) percent of said monovinylidene aromatic copolymer and preferably constitutes from about 60 to about 95 (more preferably from about 65 to about 90) weight percent thereof. Such monovinylidene aromatic copolymers are typically normally solid, hard (i.e., non-elastomeric) materials having a glass transition temperature in excess of 25° C.

Suitable relatively polar comonomer ingredients for use as the minor constituent in (i.e., constituting from about 1 to about 45 weight percent of) the indicated monovinylidene aromatic copolymers include ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide, etc.; esters (especially lower, e.g., $C_1$–$C_6$, alkyl esters) of ethylenically unsaturated carboxylic acids such as methyl methacrylate, ethylacrylate, hydroxyethylacrylate, n-butyl acrylate or methacrylate, 2-ethyl-hexylacrylate, etc.; ethylenically unsaturated dicarboxylic acid imides such as N-alkyl or N-aryl maleimides such as N-phenyl maleimide, etc. Preferably said relatively polar comonomers or mixtures thereof constitute from about 5 to about 40 (more preferably from about 10 to about 35) weight percent of the indicated monovinylidene aromatic copolymer.

Especially preferred polymer blend compositions hereof are those wherein the monovinylidene aromatic copolymer is rubber modified and comprises on a total rubber modified-copolymer weight basis from about 1 to about 40 (preferably from about 2 to about 35, more preferably from about 3 to about 30 and most preferably from about 5 to about 25) weight percent of dispersed particles of a rubbery polymer having a glass transition temperature of 0° C. or lower. Especially preferred rubbery polymers for use herein are those having a glass transition temperature of −20° C. or lower. Examples of suitable such rubbery polymers include homopolymers of 1,3-conjugated alkadiene monomers; copolymers of from about 60 to about 99 weight percent of said 1,3-conjugated alkadienes with from about 1 to about 40 weight percent of a monoethylenically unsaturated monomer such as, for example, monovinylidene aromatic monomers (e.g., styrene, etc.) and ethylenically unsaturated nitriles such as acrylonitrile, methacrylonitrile etc.; ethylene/propylene copolymer rubbers and rubbery ethylene/propylene/non-conjugated diene copolymers. Especially preferred rubbery copolymers for use herein include polymers composed of from about 60 to 100 weight percent of 1,3-butadiene and from 0 to about 40 weight percent of styrene or acrylonitrile.

One particular class of rubber-modified monovinylidene aromatic copolymer ingredients of interest of for use herein are graft copolymer compositions wherein the above-discussed rubbery polymer particles serve as substrates having grafted thereto a portion of the above-described monovinylidene aromatic copolymer as a grafted superstrate and wherein the remainder of said monovinylidene aromatic copolymer constitutes a continuous matrix phase in which the indicated grafted rubbery particles are dispersed. In such instances, the matrix phase typically constitutes from about 40 to about 95 (preferably from about 60 to about 95) percent of the overall weight of the indicated rubber-modified compositions and the grafted copolymer constituents constitutes the remainder thereof. Typically the grafted copolymer constituent will have a grafted superstrate to graftable rubber substrate ratio (i.e., a graft to rubber or "G/R" ratio) of from about 0.1:1 to about 1:1 (preferably from about 0.35:1 to about 0.45:1).

While not being especially critical for the purposes of the present invention, it can be noted as a general proposition that the rubber-modified styrenic copolymer ingredients employed herein will typically have a melt flow rate (MFR) of from about 0.5 to about 12 (preferably from about 1 to about 10) grams/10 minutes as determined pursuant to ASTM D-1238 at 230° C. and 3.8 kg.

In certain especially preferred embodiments hereof, the dispersed rubbery polymer particles are of a sort which have a bimodal particle size distribution. For example, it has been observed that substantially higher impact strength is obtained within the polymer blend compositions of interest when the indicated rubbery particles are predominantly composed (e.g., from about 50 to about 90, preferably from about 65 to about 75, weight percent on a total rubbery particle weight basis) of a distinct group of particles having a volume averaged particle size of less than one micron (preferably from about 0.05 to about 0.8 micron) and wherein the remainder of said rubbery particles (e.g., from 10 to about 50, preferably from 25 to about 35, weight percent thereof) form a second distinct group of particles having a volume averaged particle size of about one micron or greater (preferably from about 1 to about 3 micron). The use of such bimodal rubber polymer particle has been found to give notably higher impact strength relative to comparable polymer blend compositions wherein the dispersed rubbery polymer particles are composed completely of rubber particles having sizes (i.e., diameters) either smaller than or greater than one micron.

The aforementioned rubber-modified monovinylidene aromatic graft copolymer hereof can suitably be prepared in any known manner by free radical polymerization of the selected comonomer materials in the presence of the modifying rubber material. Suitable techniques thus include conventional mass, solution, suspension or emulsion polymerization processes. If emulsion polymerized graft copolymers are to be employed, care should be taken to remove or neutralize residual acid moieties. Otherwise decomposition of the acetal polymer component can result. Especially preferred for use herein are rubber-modified monovinylidene aromatic graft copolymers prepared via mass or mass/suspension polymerization techniques.

In general, mass polymerization involves polymerizing a solution of the rubber and monomer(s) at conditions sufficient to form discrete rubber particles of the desired particle size dispersed throughout the polymerized monomer. The polymerization is advantageously conducted in one or more substantially linear stratified flow or so-called plug-flow reactors such as described in U.S. Pat. No. 2,727,884 which may or may not comprise recirculation of a portion of the partially polymerized product or in a stirred tank reactor wherein the contents of the reactor are essentially uniform throughout.

The polymerization is advantageously conducted in an organic liquid reaction diluent such as aromatic or inertly substituted aromatic hydrocarbons (e.g., benzene or toluene) and in the presence of a free-radical initiator such as the peroxide initiators, (e.g., dibenzoyl peroxide or 1,1-bistertiary butylperoxycyclohexane). In general, the initiator will be employed in an amount from 100 to 5000 weight parts per million weight parts of the monomers employed. The organic liquid reaction diluent is generally employed to control the viscosity of the polymerization mixture and is generally employed in an amount from 2 to 20 weight percent based on the total weight of the rubber, monomer and diluent. The polymerization mixture can further contain other adducts such as a plasticizer or lubricant (e.g., mineral oil); and antioxidant (e.g., an alkylated phenol such as ditert-butyl-p-cresol); a polymerization aid (e.g., a chain transfer agent such as an alkyl mercaptan) or a mold release agent, (e.g., zinc stearate). Temperatures at which polymerization is normally conducted are dependent on the specific components employed but will generally vary from 60° to 190° C.

In the preparation of the rubber-reinforced polymer resin, the mass polymerization can be continued to the desired completion and then treated to remove any unreacted monomer such as by flashing off the monomer and other volatiles at an elevated temperature under vacuum.

Mass/suspension polymerization involves initially mass polymerizing the monomer/rubber mixture and, following phase inversion (i.e., the conversion of the polymer from a discontinuous phase dispersed in a continuous phase of the rubber solution through the point where there is not distinct continuous or discontinuous phase in the polymerization mixture to continuous polymer phase having the rubber dispersed therethrough) and subsequent size stabilization of the rubber particles, suspending the partially polymerized product, with or without additional monomer(s), in an aqueous medium which generally contains a polymerization initiator. Subsequently, polymerization is completed using suspension polymerization techniques.

As has been noted, the indicated monovinylidene aromatic copolymer ingredient generally constitutes from about 5 to about 98 weight percent) of the polymer blend compositions hereof. Preferably, said monovinylidene aromatic copolymer is employed in amounts corresponding to from about 12 to about 90 (more preferably from about 15 to about 80, especially from about 20 to about 70) parts by weight per 100 parts of the combined or total weight of the selected monovinylidene aromatic copolymer, acetal homopolymer or copolymer and elastomeric polymer ingredients.

The acetal (sometimes termed polyoxymethylene) resin can be any of those commonly known in the art or commerically available. Thus the acetal resin either can be linear or branched and can be a copolymer or a homopolymer or mixtures of these. Copolymers can contain one or more comonomers such as those generally used in preparing acetal resins. Comonomers more commonly used include alkylene oxides of 2 to 12 carbon atoms, in a less than 20 wt. percent amount. Polyoxymethylenes which contain from 0.5 to 10 percent, in particular from 1 to 5 percent of ethylene oxide are particularly important commercially and are especially preferred for use herein. As a general rule, the available acetal resins have thermally stable terminal groups, such as ester or ether groups, for example acetate or methoxy groups. The polyoxymethylenes have, in general, a molecular weight of from about 10,000 to about 100,000. As an alternative to molecular weight, melt flow rate (MFR) is commonly used to characterize resins, and those with higher molecular weights have lower melt flow rates. Preferred acetal resins for use in the compositions of the present invention have MFR's of from about 0.1 to about 60 (more preferably from about 0.5 to about 30 and most preferably from about from 0.5 to about 5 or 10) grams/10 minutes, as measured pursuant to ASTM D-1238 at 190° C. and 2.16Kg. If the MFR is too high, the melt viscosity of the acetal will be too low and it will be difficult to achieve sufficient intimate mixing of components at appropriate shear rates. If the MFR is too low, the temperature for the compounding operation may become too high and degradation can result. As will be evident in the examples, and assuming all other parameters are equal, the lower the MFR, the higher the toughness of the compositions of the present invention.

As noted above, the acetal polymer ingredient of the subject polymer blend compositions can generally constitute from about 1 to about 94 weight percent) of said polymer blend compositions. Preferably, said acetal polymer is utilized in an amount corresponding to from about 5 to about 80 (more preferably from about 10 to about 60, especially from about 10 to about 50) parts by weight per 100 parts by weight of the total or combined weight of the selected acetal polymer and monovinylidene aromatic copolymer ingredients.

In certain preferred embodiments hereof, it is desirable to employ the indicated acetal polymer ingredient in relatively larger proportions such as for example at levels ranging (on a per 100 parts by weight total polymer basis) from about 40 to about 90 (more preferably from about 45 to about 80 and most preferably from about 50 to about 75) parts by weight. These latter types of blend compositions are particularly beneficial in those instances wherein properties such as dimensional stability at elevated temperature, chemical resistance or enhanced hardness characteristics are of primary importance or concern. In such instances from about 5 to about 55 parts by weight of the monovinylidene aromatic copolymer and about 5 to about 35 parts by weight of thermoplastic polyurethane or elastomeric copolyester will be employed in combination with said acetal polymer ingredient.

Elastomeric materials suitable for use herein include, as noted above, thermoplastic polyurethanes and elastomeric copolyester materials. Thermoplastic polyurethanes suitable for use herein include any of those generally known in the art and thus include those prepared from a diisocyanate, a polyester, polycaprolactone or polyether and a chain extender. Such thermoplastic polyurethanes are substantially linear and maintain thermoplastic processing characteristics.

A preferred group of polyether-based polyurethanes used in the polymer blend composition of the present invention are the reaction products of: (i) 4,4'-methylene bis(phenyl isocyanate), (ii) a polyether polyol (such as for example, a poly (oxy-1,2 propylene) glycol or a polyoxytetramethylene glycol) having a number average molecular weight within the range of about 600 to about 3000 (preferably from about 1000 to about 2500) and (iii) chain extending agent such as diol extenders selected from the group consisting of aliphatic straight chain diols having from 2 to about 6 carbon atoms, bis(2-hydroxy-ethyl) ether of hydroquinone, bis(2-hydroxy-ethyl) ether of resorcinol, and mixtures of any two or more of such diol extenders and/or other difunctional chain extending agents containing 2 active hydrogen-containing groups which are reactive with isocyanate groups.

Suitable chain extending agents for use herein may include any difunctional compounds containing two active hydrogen-containing groups which are reactive with isocyanate groups. Examples of such suitable chain extending agents thus include diols including ethylene glycol, propylene glycol, butylene glycol, 1,4-butanediol, butenediol, butynediol, xylylene glycols, amylene glycols, 1,4-phenylene-bis-$\beta$-hydroxyethyl ether, 1,3-phenylene-bis-$\beta$-hydroxy ethyl ether, bis-(hydroxy-methyl-cyclohexane), hexanediol, thiodiglycol and the like; diamines including ethylene diamine, propylene diamine, butylene diamine, hexamethylene diamine, cyclohexalene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, paminobenzyl alcohol and the like. If desirable, a small amount of polyfunctional material may be utilized. This polyfunctional chain extender, however, should not be present in an amount greater than about 1 percent by weight. Any suitable polyfunctional compound may be used for this purpose such as, for example, glycerine, trimethylolpropane, hexanetriol, pentaerythritol and the like.

As used herein, the term "aliphatic straight chain diols having from 2 to about 6 carbon atoms" means diols of the formula HO(CH2)n OH wherein n is 2 to about 6 and there is no branching in the aliphatic chain separating the OH groups. The term is inclusive or ethylene glycol, 1,3-propanediol, 1,4-butanediol, 1,5-pentanediol and 1,6-hexanediol. Preferred diol extenders for use herein include 1,4-butanediol, 1,6-hexanediol and the bis(2-hydroxy-ethyl) ether of hydroquinone; an especially preferred diol extender being 1,4-butanediol.

Other diisocyanates which may be used in place of or in combination with the preferred species mentioned above [i.e., 4,4'-methylene bis (phenyl isocyanate)] include ethylene diisocyanate, ethylidene diisocyanate, propylene diisocyanate, butylene diisocyanate, cyclopentylene-1,3-diisocyanate, cyclohexylene-1,4-diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphtylene diisocyanate, 1,5-naphthylene diisocyanate, diphenyl-4,4'-diisocyanate, azobenzene-4,4'diisocyanate, diphenyl sulfone-4,4'diisocyanate, dichlorohexamethylene diisocyanate, tetramethylene diisocyanate, pentamethylene diisocyanate, hexamethylene diisocyanate, 1-chlorobenzene-1,4-diisocyanate, furfurylidene diisocyanate and the like.

The polyether polyol and chain extending agent are typically used in the polyurethane reaction medium in a ratio of about 0.5 to about 2.5 equivalents (e.g., mole equivalents) of the chain extender per equivalent of the polyol. Preferably, the equivalents ratio is from about 1 to about 2. Most preferably the ratio is from about 1.2 to about 1.6 equivalents of extender per equivalent of the polyol when said polyol has a molecular weight of about 2000, and especially when the extender is an aliphatic straight chain diol. When the aforementioned hydroquinone or resorcinol extender are used, the equivalents ratio may be lower than the above-mentioned preferred ranges, for example, as low as about 0.5 equivalents of the extender per equivalent of the polyol.

In preparing the foregoing polyether-based polyurethanes, the polyether polyol and the chain extender and the diisocyanate are typically used in relative proportions to each other such that the overall ratio of isocyanate equivalents or groups to total hydroxyl equivalents or groups or other active hydrogen-containing groups (i.e., polyol plus extender) is within the range of about 1:1 to about 1.08:1.0 and preferably is within the range of about 1.02:1.0 to about 1.07:1.0. The most preferred ratio of isocyanate (NCO) groups to total hydroxyl (OH) groups (or combined hydroxyl plus other active hydrogen groups) is within the range of from about 1.03:1.0 to about 1.06:1.0.

The term equivalent(s) as used with respect to the polyurethane preparation herein is based on the hydroxyl (or other active hydrogen) groups and the isocyanate groups within the reactants.

Suitable techniques for the preparation of the aforementioned polyether-based thermoplastic polyurethanes are known in the art and are discussed, for example, within the teachings in Columns 4–6 of U.S. Pat. No. 4,665,126 to Kusumgar et al., said teachings being hereby incorporated herein by reference thereto.

The polyether-based thermoplastic polyurethanes employed in the practice of the present invention are typically characterized by a ClashBerg modulus $(T_f)$ which is less than about $-10°$ C. The $T_g$ (glass transition temperature) of the polyurethanes is essentially the same value. The polyether-based polyurethanes may suitably have, for example a Shore A Hardness of 95A or less, and a weight average molecular weight in excess of 100,000.

A preferred group of thermoplastic polyester-based polyurethanes for use in the present invention are the reaction products of: (i) 4,4'methylenebis(phenyl isocyanate; (ii) a polyester of adipic acid and a glycol having at least one primary hydroxyl group; and (iii) a difunctional chain extender of the sort described above having 2 active hydrogen-containing groups which are reactive with isocyanate groups.

In preparing the polyester precursor of this group of polyurethanes the adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.02 percent preferably from about 0.01 to 0.05 percent.

Any suitable glycol may be used in reaction with the adipic acid such as, for example, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol and the like. In addition to the glycols, a small amount of trihydric alcohol up to about percent may be used along with the glycols such as, for example, trimethylolpropane, glycerine, hexanetriol and the like. The resulting hydroxyl polyester has a molecular weight of at least about 600, a hydroxyl number of about 25 to about 190 and preferably between about 40 and about 60, and an acid number of between about 0.5 and about 2 and a water content of 0.01 to about 0.2 percent.

Any suitable chain extending agent including those described above for the polyether-based thermoplastic polyurethanes) having active hydrogen containing groups reactive with isocyanate groups may be used in preparing the subject polyester-based materials. Examples of such extenders thus include diols such as ethylene glycol, propylene glycol, butylene glycol, 1,4-butanediol, butenediol, butynediol, xylylene glycols, amylene glycols, 1,4-phenylene-bis-β-hydroxyethyl ether, 1,3-phenylene-bis-β-hydroxy ethyl ether, bis-(hydroxy-methyl-cyclohexane), hexanediol, thiodiglycol and the like. Moreover, polyether polyols may also be employed as the chain extending agent (or as a portion thereof) with the result being a copolyester/polyether based thermoplastic polyurethane which is also suitable for use in the practice of the present invention.

Although thermoplastic polyurethanes based upon adipate polyesters are generally preferred for use herein, other polyester-based thermoplastic polyurethanes can also be suitably employed within the present invention such as, for example, those in which there is employed (in place of the adipic acid) succinic acid, suberic acid, sebacic acid, oxalic acid, methyl adipic acid, glutaric acid, pimelic acid, azelaic acid, phthalic acid, terephthalic acid, isophthalic acid and the like as well as those prepared using hydroxycarboxylic acids, lactones, and cyclic carbonates such as ε-caprolactone and 3-hydroxy-butyric acid in place of the adipic acid component. Similarly polyester-based thermoplastic polyurethanes prepared using the above-described alternative diisocyanates in place of 4,4'-methylene bis (phenyl isocyanate) can also be suitably employed in the practice of the present invention.

The aforementioned types of polyester-based thermoplastic polyurethanes are generally known materials. Suitable methodology for the preparation thereof is disclosed within Column 7 of U.S. Pat. No. 4,665,126 and is incorporated herein by reference.

Especially preferred thermoplastic polyurethanes for use herein include those having a Shore hardness (ASTM D2240) between about 70 on the "A" scale and 60 on the "D" scale.

If desired, the thermoplastic polyurethane employed in the practice of the present invention can have incorporated in it additives such as pigments, fillers, lubricants, stabilizers, antioxidants, coloring agents, fire retardants, and the like, which are commonly used in conjunction with polyurethane elastomers.

Elastomeric polymer ingredients suitable for use herein also include polyester-based elastomers other than the ester-based polyurethane materials which have been discussed above. Examples of such other elastomers include elastomeric copolyether-ester resin material and elastomeric adipate-carbonate mixed ester resin materials.

Suitable copolyether-ester elastomer ingredients can be generally described as comprising a multiplicity of recurring intralinear long-chain and short-chain ester units connected head-to-tail through ester linkages, said long chain ester units generally constituting from about 25 to about 85 weight percent of said copolyether-ester elastomer and corresponding to the formula:

wherein

G is a divalent radical remaining after removal of terminal hydroxyl groups from a poly-(alkylene oxide) glycol having a carbon-to-oxygen mole ratio of about 2-4.3 and a molecular weight of about 400-6000; and R is a divalent radical remaining after removal of carboxyl groups from a dicarboxylic acid having a molecular weight less than about 300; and said short chain ester units generally constituting from about 15 to about 75 weight percent of said elastomer and corresponding to the formula:

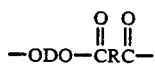

wherein

D is a divalent radical remaining after removal of hydroxyl groups from a low molecular weight diol having a molecular weight less than about 250; and R is as defined above.

Preferably, the indicated polyether-ester elastomers have a relatively low molecular weight as evidenced by their exhibiting an inherent viscosity of about 0.05–0.95 (preferably from about 0.1 to about 0.8 and most preferably from about 0.1 to 0.5) when measured in m-cresol at a 0.1 g/dl concentration at 30° C.

A more detailed description of the aforementioned polyether-ester elastomers (including preferred embodiments thereof, preparation methodology, the use of small amounts of the low molecular weight materials as a processing aid for polyacetal resins and the use, as per German Patent 2,449,343, of higher molecular weight versions as impact modifiers for polyacetal resins) is presented within U.S. Pat. No. 4,117,033 to Gale, the disclosure of which is hereby incorporated by reference.

Suitable elastomeric adipate-carbonate mixed ester materials for use herein include those described within U.S. Pat. No. 4,683,267 to Lindner et al. for use as property modifiers for polyoxymethylene resin-based molding compositions. Such materials are rubber-like high molecular weight compounds corresponding to the formula

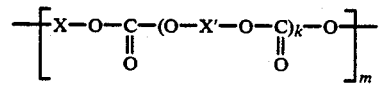

wherein

X and X' represent residues of the reaction product of a polyhydric alcohol and adipic acid having a molecular weight of from 800 to 3,500;

k represents an integer of from 0 to 10; and m represents an integer greater than 20, preferably from 22 to 100; which compounds have a limiting viscosity number [η] (Staudinger Index) in tetrahydrofuran of from 0.8 to 2.5 dl/g.

The following are examples of polyhydric alcohols which may be used, optionally as mixtures, for the polyesters from which the residues X and X' are derived: ethylene glycol, propylene glycol-(1,2) and -(1,3), butylene glycol-(1,4) and -(2,3), hexane diol-(1,6), octane diol-(1,8), neopentyl glycol, cyclohexane dimethanol, 1,4-bis-(hydroxymethyl cyclohexane), 2-methyl-1,3-propane diol, diethylene glycol, triethylene glycol, tetraethylene glycol, dipropylene glycol and dibutylene glycol.

The reaction products obtained from adipic acid and the alcohols are polyesters having hydroxyl end groups. The molecular weights thereof range from about 800 to about 3,500. The adipate-carbonate mixed esters are prepared from these polyesters by a reaction with difunctional carbonic acid aryl esters. These correspond in particular to the following general formula

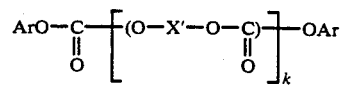

wherein

Ar represents a substituted or unsubstituted aryl group having from 6 to 18 carbon atoms, preferably carbon atoms; and k and X' are as defined above.

Further details concerning preferred embodiments of the indicated adipate-carbonate mixed esters and concerning suitable techniques for the preparation thereof are contained in the indicated Lindner et al. patent and are incorporated herein by reference thereto.

As has been noted, the above-described elastomeric polymer ingredients are generally employed within the subject polymer blends in an amount ranging from about 1 to about 50 parts by weight per 100 parts of the combined weight of the stated polymer ingredients. In certain preferred embodiments, said elastomeric ingredient is employed in amounts ranging from about 5 to about 50 (especially from about 5 to about 38 and most preferably from about 10 to about 35) parts by weight per 100 parts by weight of the total polymer ingredients.

In some instances, it is preferred that the elastomeric ingredient be employed at relatively lower levels such as, for example, in amounts of from about 1 to about 25 (preferably from about 5 to about 25 and especially from about 10 to about 20 or 25) parts by weight on a 100 parts total polymer weight basis.

In other cases, as for example when a more elastomeric character is desired in the subject blend composition, it is preferred that the indicated elastomeric ingredient be employed in amounts ranging from about 20 to about 50 (more preferably from about 20 to about 38 and most preferably from about 25 to about 35) parts by weight per 100 parts total weight of the specified polymer ingredients.

In the above described embodiments, it has been found especially advantageous to employ the ester-based elastomeric materials either alone, or in combination with each other or to employ on a total elastomeric ingredient weight basis, at least about 30 weight percent, preferably about 50 weight percent or more of such an ester-based system in combination with up to about 70 weight percent, preferably about 50 weight or less, of an ether-based thermoplastic polyurethane material.

The polymer blend compositions hereof are conveniently prepared by dry blending the individual polymer ingredients to be employed in particulate (e.g., pelletized) form and in the quantitative proportions desired in a given instance and thereafter melt compounding the particulate polymer mixture in accordance with known extrusion compounding techniques. In connection with the indicated melt compounding operation, it is generally preferred to conduct such operation at a temperature of not significantly exceeding 240° C., especially at a melt temperature in the range of from about 180 to about 230° C.

The polymer blend compositions hereof can also optionally include, and oftentimes will preferably include, additional thermoplastic ingredients in addition to those described above. Thus, for example, it has been observed that desirable and advantageous property benefits can be obtained by additionally including a thermoplastic polycarbonate or polyester resin constituent in either minor or substantial proportions within the monovinylidene aromatic copolymer/acetal resin/thermoplastic polyurethane or elastomeric copolyester blend compositions hereof.

Various optional additives may also be included in the polymer blend compositions hereof for different purposes as well known in the art, including bisphenol-type, ester-type or hindered phenol-type additives and anti-oxidants as disclosed, for example, in U.S. Pat. Nos. 3,103,499 and 3,240,753, amine and amidine as disclosed, for example, in U.S. Pat. Nos. 3,313,767 and 3,314,918, nucleants, UV screens and absorbers, metal soaps, glass beads, talc, polymeric substances other than those critical to this invention such as additives commonly known as mold release agents, plasticizers, antistatic agents, etc. which are compatible with the blends and color pigments which are compatible with acetal polymers. However, the use of the mentioned additives is not considered to be necessary for the operability of present invention.

With regard to the aforementioned optional additive materials, it is important to note that a surprising phenomenon has been discovered in the context of the subject polymer blends in that the addition of a minor amount (e.g., from about 0.01 to about 5, preferably from about 0.05 to about 1.5 and especially from about 0.1 to about 1.0 weight percent) of certain selected antioxidant and/or U.V. stabilizer ingredients has been found to unexpectedly also provide dramatically increased impact strength within the polymer blend compositions of concern. In particular, U.V. light stabilizers comprising sterically hindered amines and/or ester functional groups as well as substituted benzotriazoles (for example TINUVIN ® 770 and 234) and anitoxidants comprising p-hydroxyphenyl propionic acid esters (for example IRGANOX ® 245) have been found to be effective in this regard. Especially preferred in this connection are compositions which employ from about 0.1 to about 0.5 weight percent of TINUVIN ® 234 and/or from about 0.1 to about 1.0 weight percent of TINUVIN ® 770 and particularly when one or both of the former are used in combination with from about 0.1 to about 0.5 weight percent of IRGANOX ® 245.

The polymer blend compositions hereof preferably also contain a minor proportion (e.g., from about 0.01 to about 15 parts by weight per 100 parts by weight of the overall blend composition) of one or more oxirane or substituted oxirane-containing ingredients. In this regard, it can be noted that the inclusion of oxirane or substituted oxirane-containing ingredients has been found to substantially improve the color stability of the subject polymer blends during the melt processing (e.g., melt blending and/or injection molding) thereof and to thereby widen the processability window of such blends by allowing increased processing temperatures to be employed without encountering discoloration problems.

Oxirane or substituted oxirane-containing ingredients for use herein are preferably selected from epoxyhydrocarbons, such as, for example mono- or diglycidyl ethers of aromatic or aliphatic alcohols, with bisphenol-A or substituted bisphenol-A, orthocresol and 1,6-hexanediol being preferred alcohols. Other preferred substituted oxirate-containing ingredients include epoxidized vegetable oils, preferably epoxidized soybean and epoxidized linseed oil. Other suitable, but somewhat less preferred oxirane-containing ingredients are based upon epoxidized alkyl fatty esters, epoxy acids, epoxy salts as well as other epoxy-group functionalized ingredients.

Another phenomenon which has been observed in connection with the polymer blends hereof relates to the glass fiber reinforcement thereof. Specifically, it has been found that compounded fiberglass reinforced polymer blend compositions hereof (e.g., containing from about 5 to about 80 weight percent glass fiber on a total composition weight basis) may exhibit an unexpected combination of thermal stability characteristics (e.g., Vicat softening temperature or heat distortion temperature) and impact properties and also that said phenomenon is particularly pronounced and beneficial at fiberglass contents of from about 15 to about 60 (especially from about 20 to about 50) weight percent on a total composition weight basis and at acetal polymer to monovinylidene aromatic copolymer weight ratios of from about 25:75 to about 50:50.

The polymer blend compositions of the present invention have good processability characteristics and are suitable for use in a wide variety of injection molding applications. Such compositions are particularly useful in such applications wherein good thermal/dimensional stability, creep resistance and chemical resistance properties are required and have also been found to be paintable. Suitable exemplary end-use applications thus include automotive interior and exterior parts, tool casings, appliance housings and the like.

The present invention is further understood and illustrated by reference to the following examples thereof. Physical property data presented in such examples was generated according to the following test methods:

| Physical Property | Test Method |
|---|---|
| Izod Impact | ASTM D256 |
| Charpy Impact | ISO 179-1982 |
| Tensile Properties | ISO R527-1966 Specimen 1 (100 mm/min) |
| Flexural Properties | ISO 178-1975 (1 mm/min) |
| Vicat Softening Point | ISO 306-1974 Method A 120° C./hour | injection molding (at 210° C.) into appropriate testing specimens.

The results of the physical property testing, and the compositional make-up of the 2 and 3 component blends of concern, are summarized in Table I.

TABLE I

| | Comparative Samples | | | Example |
|---|---|---|---|---|
| Polymer Component | A | B | C | 1 |
| ABS[1] (WT. %) | — | 100 | 50 | 40 |
| POM[2] (WT. %) | 100 | — | 50 | 40 |
| TPU[3] (WT. %) | — | — | — | 20 |
| Izod Impact (J/M) | 46 | 185 | 20 | 252 |
| Vicat S.P. (°C.) | 163 | 108 | 143 | 142 |
| Tensile* Ty (MPa) | 56 | 35 | 39 | 39 |
| Er (%) | 56 | 50 | 14 | 72 |
| Youngs Modulus (MPa) | 2640 | 1900 | 2090 | 1600 |

[1]ABS1 = Mass ABS (16 percent AN, 12 wt. percent Polybutadiene, 1.2 μm rubber particle size)
[2]POM = Ultraform ™ N2320 Acetal Copolymer (BASF) MFR = 9.0 g/10 min. (190° C., 2.16 kg)
[3]TPU = Polyester-based thermoplastic polyurethane available from The Dow Chemical Company as Pellethane ™ 2355-55D.

Examples 2-8

In these experiments the procedure of Example 1 is repeated using the same ABS and POM components as in Example 1 but using a different polyester-based TPU resin (i.e., Pellethane ™ 2355-80A from The Dow Chemical Company) and using different proportions of the various polymer ingredients.

The compositional details and the physical property test results for the resulting blend compositions are set forth in Table II hereof.

TABLE II

| Polymer Component | Comparative Samples | | | | | Examples | | | | | | |
|---|---|---|---|---|---|---|---|---|---|---|---|---|
| | D | E | F | G | H | 2 | 3 | 4 | 5 | 6 | 7 | 8 |
| POM Ultraform N2320 (wt %) | 100 | 75 | 50 | 25 | — | 6.26 | 18.76 | 25.00 | 81..24 | 37.50 | 15.62 | 41.66 |
| ABS (WT. %) | — | 25 | 50 | 75 | 100 | 81.24 | 43.74 | 25.00 | 6.26 | 37.50 | 78.12 | 41.66 |
| TPU (WT. %) | — | — | — | — | — | 12.50 | 37.50 | 50.00 | 12.50 | 25.00 | 6.26 | 16.68 |
| Izod Impact 23° C. J/M | 86 | 34 | 28 | 55 | 203 | 546 | n.b.* | n.b. | 126 | 895 | 162 | 195 |
| Tensile Yield V = 100 mm/min. | 64 | 50 | 46 | 44 | 38 | 37 | 21 | 18 | 45 | 28 | 40 | 34 |
| E at Rupture % | 37 | 7.3 | 8.1 | 13.7 | 30 | 28 | >>83 | >>80 | 76 | >>80 | 21 | >>80 |
| Young's Modulus (MPa) | 3100 | 2670 | 2230 | 2100 | 1960 | 1704 | 700 | 430 | 1900 | 1120 | 187 | 1580 |
| Vicat (°C.) | 163 | 160 | 144 | 111 | 107 | 104 | 103 | 107 | 162 | 124 | 107 | 12.9 |
| Flexural Modulus (MPa) | 2290 | 1940 | 1930 | 2010 | 1760 | 1610 | 780 | 380 | 1580 | 1060 | 1680 | 1310 |

*n.b. = No break: Izod impact greather than 1250 J/M

Example 1

In this example, a three component butadiene rubber-modified styrene acrylonitrile copolymer (ABS)/acetal resin (POM)/thermoplastic polyurethane (TPU) blend is prepared and subjected to physical property testing and evaluation.

For the purpose of comparison, of 2 component ABS/POM blend having the same ABS/POM ratio is prepared and is subjected to physical property evaluation along with the individual ABS and POM constituents.

In preparing the indicated 2 and 3 component blends the individual blend components, in pelletized form, are weighed out and combined in the desired proportions, tumble blended for 10 minutes, melt compounded using a Buss Ko-Kneader operated at 210° C., 15 Kg/hr throughput and pelletized for subsequent drying and

Examples 9-16

In these experiments a series of blend compositions illustrating the use of different monovinylidene aromatic copolymer ingredients, or their mixtures, are prepared according to the procedures outlined in Example 1 and subjected to physical property testing.

Blend compositions contain 15 or 17 weight percent of a TPU resin, together with a 50/50 weight ratio of styrenic copolymer/acetal providing the balance. The acetal resin employed is Ultraform ™ N2320 except where indicated in Table III, in which the styrenic copolymers are also fully described.

Additional component and composition details together with physical property test results for the resulting blend compositions are set forth in Table III.

Examples 21-29

In this series of experiments, blend compositions illustrating the use of different thermoplastic polyurethanes, or their mixtures, are prepared according to the procedures outlined in Example 1 and subjected to physical property testing. Example 29 illustrates the use of copolyester-ether elastomer products such as Hytrel TM (available from Du Pont de Nemours) as alternative blend components in place of the TPU resins. The blend compositions contain the total weight percent of TPU resin given in Table V with the balance being a 50/50 weight ratio of ABS1 of Example 1 and unless otherwise indicated in Table V, Celcon TM M25 acetal resin.

The TPU resins employed, available from The Dow Chemical Company are as follows:

"Ester" is Pellethane TM 2355-80A (adipate ester based)

"PCL" is Pellethane TM 2102-90A (polycaprolactone-based)

"Ether" is Pellethane TM 2103-85A (polytetramethylene glycol-based)

As can be seen from the physical property results presented in Table V, the compositions containing the ester-based TPU are highly ductile materials.

TABLE III

| Polymer Component | | 9 | 10 | 11[a] | 12 | 13[b] | 14 | 15 | 16 |
|---|---|---|---|---|---|---|---|---|---|
| Styrenic Copolymer | | SAN | SAN | ABS | ABS | ABS | ABS | ABS/SMA[1] | Dylark 250[2] |
| AN Level | (Wt. %) | 20.2 | 33.2 | 8.9 | 18.2 | 20.0 | 20.5 | — | — |
| Polybutadiene Content | (Wt. %) | — | — | 8.5 | 8.3 | 15.0 | 12.1 | — | — |
| Rubber Particle Size | Microns | — | — | 2.6 | 1.5 | 0.6 | 1.2 | — | — |
| TPU (Pellethane TM 2355-80A) | (Wt. %) | 17 | 17 | 15 | 17 | 15 | 17 | 17 | 15 |
| PROPERTIES | | | | | | | | | |
| Izod Impact 23° C. | (J/M) | 85 | 100 | 150 | 180 | 200 | 180 | 140 | 120 |
| Charpy Impct 23° C. | (KJ/m$^2$) | 5.2 | 5.1 | 7.4 | 8.1 | 12.0 | 10.2 | 7.9 | 11.3 |
| Tensile Yield | (MPa) | 53 | 52 | 33.7 | 41.2 | 44 | 37.5 | 44.1 | 34.4 |
| Tensile Rupture Elongation | (%) | 48 | 43 | >80 | >80 | 15 | >80 | 75 | 58 |
| Youngs Modulus | (MPa) | 2400 | 2570 | 1310 | 1670 | 1850 | 1410 | 1830 | 1550 |
| Flexural Modulus | (MPa) | 1930 | 1850 | 1210 | 1570 | 1575 | 1340 | 1630 | 1670 |
| Vicat | (°C.) | 129 | 133 | 125 | 126 | 122 | 129 | 134 | 133 |

[1]50/50 weight ratio mixture of ABS1 (Table 1)/styrene-maleic anhydride copolymer (16 wt. % MA).
[2]Impact modified styrene-maleic anhydride copolymer from ARCO.
[a]Acetal resin Celcon TM M25
[b]Acetal resin Ultraform TM H2320

Examples 17-20

In these experiments, a series of blend compositions illustrating the use of different acetal components are prepared according to the procedures outlined in Example 1 and subjected to physical property testing.

Blend compositions contain 42.5 parts by weight of ABS1 of Example 1, 15 parts by weight of a TPU resin, Pellethane TM 2355-80A and 42.5 parts by weight of the acetal resins. The different acetal resins employed are as follows:

Celcon TM M25, M140 are linear, copolymer resins containing approximately 2 weight percent ethylene oxide, but differing in Melt flow index, and available from Hoechst-Celanese.

Celcon TM U10-01 is a terpolymer resin described in U.S. Pat. No. 4,707,525 as containing butanediol diglycidyl ether/ethylene oxide/trioxane in the weight ratio of about 09.05/2.0/97.95 respectively, and available from Hoechst-Celanese.

Delrin TM 100 is an acetal homopolymer resin available from Du Pont de Nemours and Company.

Physical property data for the said compositions are presented in Table IV.

TABLE IV

| Polymer Component | | 17 | 18 | 19 | 20 |
|---|---|---|---|---|---|
| Acetal Resin | | Celcon TM M25 | Celcon TM M140 | Celcon TM U10-01 | Delrin TM 100 |
| MFR (g/10 min at 190° C. and 2.16 kg) | | 2.5 | 12.2 | 1.0 | 2.0 |
| PROPERTIES | | | | | |
| Izod Impact 23° C. | (J/M) | 250 | 150 | 240 | 240 |
| Charpy Impact 23° C. | (KJ/m$^2$) | 13.5 | 9.0 | 15.4 | 15.0 |
| Tensile Yield | (MPa) | 33 | 31 | 36 | 35 |
| Tensile Rupture Elongation | (%) | 180 | 120 | 38 | 150 |
| Youngs Modulus | (MPa) | 1400 | 1350 | 1470 | 1310 |
| Flexural Modulus | (MPa) | 1140 | 1110 | 1450 | 1370 |
| Vicat | (°C.) | 120 | 126 | — | 140 |

TABLE V

| Polymer Component | 21 | 22 | 23 | 24 | 25 | 26 | 27 | 28 | 29 |
|---|---|---|---|---|---|---|---|---|---|
| TPU (Wt. % in blend) | 17 | 17 | 15 | 15 | 15 | 35 | 35 | 35 | 15 |
| TPU/elastomer description | PCL | Ether | Ester | Ester/PCL | Ester/Ether | PCL | PCL/Ether | Ester | Hytrel[1] 4056 |

TABLE V-continued

| Polymer Component | | 21 | 22 | 23 | 24 | Example 25 | 26 | 27 | 28 | 29 |
|---|---|---|---|---|---|---|---|---|---|---|
| TPU mixture composition | (Wt %) | 100 | 100 | 100 | 33.3/66.7 | 50/50 | 100 | 50/50 | 100 | 100 |
| PROPERTIES | | | | | | | | | | |
| Izod Impact 23° C. | (J/M) | 95 | 60 | 245 | 215 | 220 | 760 | 840 | 840 | 75 |
| Charpy Impact 23° C. | (KJ/m$^2$) | 4.7 | 3.4 | 13.5 | 10.4 | 10.5 | 17.5 | 25.0 | 34.5 | 9.0 |
| Tensile Yield | (MPa) | 37 | 35 | 33 | 36 | 34 | 28 | 28 | 23 | 35 |
| Tensile Rupture Elongation | (%) | >80 | 15 | >120 | >120 | >120 | >300 | >300 | >300 | 36 |
| Young Modulus | (MPa) | 1530 | 1420 | 1400 | 1460 | 1380 | 900 | 990 | 660 | 1700 |
| Flexural Modulus | (MPa) | 1340 | 1330 | 1140 | 1500 | 1380 | 840 | 1080 | 640 | 1330 |
| Vicat | (°C.) | 130 | 130 | 127 | — | — | 123 | — | 114 | 131 |

[1] Product and trademark of Du Pont de Nemours

EXAMPLE 30

In this example, the blend composition of Example 8 is tested for chemical resistance and is compared to the ABS and acetal blend components.

The chemical resistance test data presents the percentage change in tensile properties after a five (5) minute immersion of test bars at 1 percent flexural strain in a solvent mixture of isooctane/toluene/methanol (42.5/42.5/15 parts by weight respectively). Tensile testing is conducted 1 hour after removal from solvent. The results are presented in Table VI.

As can be seen, the blend composition of Example 8 exhibits excellent resistance to the indicated solvent mixture.

TABLE VI

| | Chemical Resistance | | | |
|---|---|---|---|---|
| | Tensile | | Elongation | |
| Sample | Yield | Rupture | Yield | Rupture |
| Example 8 of Table II | −6 | −6 | −3 | 0 |
| ABS | S.D.* | S.D. | S.D. | S.D. |
| Acetal | −3 | −3 | +9 | +1 |

*S.D. = Severe Degradation. Could not be tested.

Examples 31-33

In this experiment, a series of glass fiber filled ABS/POM/TPU blend compositions are prepared and subjected to physical property testing The test results are set forth in Table VII.

The unexpectedly enhanced performance of these blends, especially the enhanced impact strength thereof, is demonstrated by comparison with Comparative Examples I, J and K in Table VII.

TABLE VII

| Composition (Wt. %) | Examples 31 | 32 | 33 | Comparative Experiments I | J | K |
|---|---|---|---|---|---|---|
| POM (1) | 42 | 23 | 31 | 40 | 20 | — |
| ABS (2) | 25 | 41 | 31 | 40 | 60 | 100 |
| TPU (3) | 12 | 11 | 20 | — | — | — |
| Fiberglass (4) (5) | 20 | 25 | 18 | 20 | 20 | 20 |
| Izod Impact RT (J/M) | 110 | 114 | 118 | 40 | 40 | 100 |
| Charpy Impact RT (KJ/M$^2$) | 10 | 10 | 19 | 5 | 5 | 8 |
| Tensile Yield* (MPa) | 73 | 74 | 60 | 90 | 76 | 75 |
| Tensile Modulus (MPa) | 5562 | 6210 | 3920 | 7600 | 6400 | 6200 |
| E at Rupture (%) | 3.2 | 3.2 | 7 | 2 | 2 | 2 |
| Flexural Modulus (MPa) | 4000 | 4400 | 2400 | 4770 | 4680 | 5060 |
| Vicat (°C.) | 156 | 123 | 136 | 161 | 124 | 114 |

(1) POM = Ultraform ™ H2320 from BASF (MFR = 2.5 at 190° C. and 2.16 kg).
(2) ABS = Butadiene rubber modified styrene (see note 2 of Table VIII).
(3) TPU = Pellethane ™ 2355-80A from The Dow Chemical Company.
(4) Fiberglass = 4.5 mm long chopped strands type 429 YZ from Owens Corning Fiberglass.
(5) Glass content determined via ISO 3451/1 (Ash test).

Examples 34-39

In these examples, a series of ABS/POM/TPU blend compositions are prepared containing one or more light stabilizer or antioxidant ingredients. The resulting blend compositions are subjected to physical testing, the results of which are summarized in Table VIII. As can be seen from said results, the blend compositions containing one or more of the indicated stabilizer and/or antioxidant ingredients exhibit surprisingly better Izod and Charpy impact strengths in comparison with that of the composition of the Comparative Experiment L.

TABLE VIII

| Polymer Component | Example 34 | 35 | 36 | 37 | 38 | 39 | Comparative Experiment L |
|---|---|---|---|---|---|---|---|
| POM[1] (WT. %) | 42.0 | 42.25 | 42.12 | 42.37 | 42.25 | 42 | 42 |
| ABS[2] (WT. %) | 42.0 | 42.25 | 42.12 | 42.37 | 42.25 | 42 | 42 |
| TPU[3] (WT. %) | 15.0 | 15.0 | 15.0 | 15.0 | 15.0 | 15 | 16 |
| Irganox ® 245[4] | 0.25 | 0.50 | — | — | — | 0.25 | — |
| Tinuvin ® 234[5] | 0.25 | — | 0.25 | 0.25 | — | 0.25 | — |
| Tinuvin ® 770[5] | 0.50 | — | 0.50 | — | 0.50 | — | — |
| Tinuvin ® 765[5] | — | — | — | — | — | 0.50 | — |
| Izod Impact RT (J/M) | 470 | 254 | 396 | 345 | 356 | 310 | 195 |
| Charpy Impact | 24 | 15 | 24.5 | 24.0 | 22.0 | 16 | 13 |

TABLE VIII-continued

| Polymer | Example | | | | | | Comparative |
|---|---|---|---|---|---|---|---|
| Component | 34 | 35 | 36 | 37 | 38 | 39 | Experiment L |
| RT (KJ/m²) | | | | | | | |

[1]POM = Ultraform ™ H2320 from BASF (MFR = 2.5 at 190° C. and 2.16 kg).
[2]ABS = Butadiene rubber-modified styrene (acrylonitrile copolymer containign 12 percent polybutadiene (volume average particle size of 1.2 micron) and containing 16 weight percent acrylonitrile.
[3]TPU = Pellethane ™ 2355-80A from The Dow Chemical Company.
[4]Irganox ® 245 = antioxidant (a p-hydroxyphenyl propionic acid ester)
[5]U.V. light stabilizers comprising sterically hindered amine and/or ester functional groups.

Examples 40–46

In these examples, a series of ABS/POM/TPU blends are prepared at 15 weight percent TPU contents and at different ABS:POM weight ratios and using ABS resins having differing rubber particle size distributions. The compositional details of said compositions and the physical property characteristics thereof are summarized in Table IX. As can be seen from the results therein, the compositions utilizing the ABS resins having a bimodal rubber particle size distribution (i.e.,Examples 43–45) exhibit notably better Izod impact properties than their monomodal ABS-containing counterparts.

The acetal resin employed in this series is Kematal ™ M25 available from Hoechst-Celanese and having a melt flow rate of approximately 2.5 and the TPU resin is Pellethane ™ 2355-80A from The Dow Chemical Company.

TABLE IX

| Composition | Example | | | | | | |
|---|---|---|---|---|---|---|---|
| | 40 | 41 | 42 | 43 | 44 | 45 | 46 |
| ABS-1[3] | 42.5 | 52 | 33 | — | — | — | — |
| ABS-2[4] | — | — | — | 42.5 | 52 | 33 | — |
| ABS-3[5] | — | — | — | — | — | — | 42.5 |
| POM | 42.5 | 33 | 52 | 42.5 | 33 | 52 | 42.5 |
| TPU | 15 | 15 | 15 | 15 | 15 | 15 | 15 |
| PROPERTIES[2] | | | | | | | |
| Izod Impact (J/M) | 250 | 400 | 210 | 360 | 590 | 280 | 200 |
| Charpy Impact (kJ/m2) | 18 | 23 | 12 | 19 | 24 | 15 | 12 |
| Dart Energy to Break (J) | 110 | 104 | 112 | 124 | 127 | 128 | 115 |
| Tensile Yield (MPa) | 33 | 34 | 35 | 42 | 42 | 40 | 44 |
| Tensile Rupture (MPa) | 32 | 29 | 30 | 31 | 31 | 32 | 38 |
| Elongation Yield (%) | 6 | 5 | 8 | 4.4 | 4.0 | 6.2 | 4.0 |
| Elongation Rupture (%) | 150 | 100 | 150 | 51 | 43 | 140 | 15 |
| Tensile Modulus (MPa) | 1300 | 1350 | 1260 | 1730 | 1770 | 1550 | 1850 |
| Flexural Strength[1] (MPa) | 38 | 40 | 37 | 53 | 55 | 48 | 54 |
| Flexural Modulus (MPa) | 1400 | 1250 | 1220 | 1815 | 1720 | 1630 | 1575 |
| Vicat S.P. (°C.) | 126 | 113 | 143 | 124 | 111 | 142 | 122 |
| DTUL (1.82 MPa) (°C.) | 66 | 69 | 66 | 67 | 67 | 67 | 68 |

[1]Flexural strength = stress at 3.5 percent strain.
[2]Tensile properties measured at 100 mm/min.
[3]ABS-1: 12 weight percent rubber, 12 weight percent acrylonitrile and monomodal rubber particle size = 1.2 micron, volume averaged.
[4]ABS-2: bimodal rubber particle size 0.6 and 1.2 micron (volume averaged) with 15 weight percent rubber total and 20 weight percent acrylonitrile.
[5]ABS-3: Monomodal rubber particle size, 0.6 micron volume averaged, with 15 weight percent rubber total and 20 weight percent acrylonitrile.

While the present invention has been described and illustrated with reference to particular embodiments and examples thereof, such is not be interpreted as in any way limiting the scope of the instantly claimed invention.

What is claimed is:

1. A polymer blend composition comprising, on the basis of a total of 100 parts by weight of the stated polymer ingredients:
   A. from about 5 to less than 55 parts by weight of a monovinylidene aromatic copolymer ingredient selected from the group consisting of
      1. non-rubber-modified monovinylidene aromatic copolymers comprising, in polymerized form and on an aromatic copolymer ingredient weight basis, from about 55 to about 99 weight percent of one or more monovinylidene aromatic monomer and from about 1 to about 45 weight percent of one or more relatively polar comonomer ingredients; and
      2. rubber-modified monovinylidene aromatic copolymers comprising, in polymerized form and on a rubber-modified copolymer weight basis from 75 to about 95 weight percent of monovinylidene aromatic copolymers as described in item A. 1. above and from about 5 to less than 25 weight percent of dispersed particles of a rubbery polymer having a glass transition temperature of 0° C. or lower said rubbery polymer being selected from the group consisting of homopolymers of a 1,3-conjugated alkadiene monomer; copolymers of from about 60 to about 99 weight percent of a 1,3-conjugated alkadiene monomer with from about 1 to about 40 weight percent of a monoethylenically unsaturated monomer; ethylene/propylene copolymer rubbers; and rubbery ethylene/propylene/non-conjugated diene copolymers;
   B. from about 10 to less than 50 parts by weight of one or more acetal homopolymer or copolymer ingredients having a melt flow rate of from 0.5 to about 10 grams per 10 minutes as measured pursuant to ASTM D-1238 at 190° C. and 2.16 Kg; and C. from about 5 to about 35 parts by weight of a thermoplastic polyurethane or elastomeric copolyester ingredient which comprises one or more ester-containing elastomeric materials employed either alone or in combination with up to about 70 weight percent, on a total elastomeric material weight basis, of an ether-based thermoplastic polyurethane ingredient.

2. The polymer blend composition of claim 1 wherein the monovinylidene aromatic copolymer ingredient is a rubber-modified monovinylidene aromatic copolymer comprising dispersed particles of a rubbery polymer selected from the group consisting of homopolymers of a 1,3-conjugated alkadiene monomer and copolymers of from about 60 to 99 weight percent of a 1,3-conjugated alkadiene monomer with from about 1 to 40 weight percent of a monoethylenically unsaturated monomer.

3. The polymer blend composition of claim 2 wherein said composition further comprises, on a total composition weight basis, from about 5 to about 80 weight percent of a particulate or fibrous inorganic filler or reinforcing ingredient.

4. The polymer blend composition of claim 3 wherein the inorganic filler or reinforcing ingredient constitutes from about 20 to about 50 weight percent of said composition on a total composition weight basis.

5. The polymer blend composition of claim 4 wherein the inorganic filler or reinforcing ingredient is glass fibers.

6. The polymer blend composition of claim 2 wherein said composition further comprises, on a total compositions weight basis, from 0.01 to about 5 weight percent of one or more U.V. stabilizer ingredients.

7. The polymer blend composition of claim 6 wherein said composition further comprises, on a total composition weight basis, from 0.01 to about 5 weight of an antioxidant ingredient.

8. The polymer blend composition of claim 7 wherein said composition comprises, on a total composition weight basis, from 0.1 to about 1.0 weight percent of one or more sterically hindered amine and/or ester functional group-containing U.V. stabilizers or one or more substituted benzo-triazole U.V. stabilizers and from about 0.1 to about 1.0 weight percent of one or more para-hydroxyphenyl propionic acid ester antioxidant ingredients.

9. The polymer blend composition of claim 1 wherein the relatively polar monomer ingredient of the monovinylidene aromatic copolymer is selected from the group consisting of ethylenically unsaturated nitriles, ethylenically unsaturated anhydrides, ethylenically unsaturated amides, esters of ethylenically unsaturated carboxylic acids and ethylenically unsaturated dicarboxylic acid imides.

10. The polymer blend composition of claim 2 wherein the rubbery polymer is a homopolymer of a 1,3-conjugated alkadiene monomer or, alternatively, a copolymer consisting of from about 60 to 99 weight percent of a 1,3-conjugated alkadiene monomer with about 1 to about 40 weight percent of monovinylidene aromatic monomers, ethylenically unsaturated nitrile monomers, or a combination thereof.

11. The polymer blend composition of claim 2 wherein the rubber-modified monovinylidene aromatic copolymer contains from 8.3 to 15 weight percent of said dispersed rubbery polymer particles.

12. The polymer blend composition of claim 2 wherein the acetal homopolymer or copolymer ingredient has a melt flow rate of from 0.5 to about 5 grams per 10 minutes as measured pursuant to ASTM D-1238 at 190° C. and 2.16 Kg.

13. The polymer blend composition of claim 2 wherein the rubber-modified monovinylidene aromatic copolymer is a graft copolymer prepared via a mass or mass/suspension polymerization technique.

* * * * *